UNITED STATES PATENT OFFICE.

HORATIO N. FRYATT, OF BELLEVILLE, NEW JERSEY.

IMPROVEMENT IN REFINING AND CRYSTALLIZING SUGAR.

Specification forming part of Letters Patent No. 33,987, dated December 24, 1861.

*To all whom it may concern:*

Be it known that I, HORATIO N. FRYATT, of Belleville, in the county of Essex and State of New Jersey, have invented a new and useful improvement for discharging concentrated sugar solutions from the vacuum-pan in the process of making and refining sugar; and I do hereby declare that the following is a full, clear, and exact description thereof.

Various methods are pursued on sugar estates and in sugar-refineries for the defecation of sugar and the juices of sugar-producing plants, and I am myself the owner of a patent granted to H. G. C. Paulsen on the 8th day of November, 1859, for defecating and clarifying sugars and juices of sugar-producing plants by the use of a mixture of alcohol and water; and when by any of these or other methods a clear solution is obtained, free from the usual impurities, it is then usual to concentrate this fluid to a sirup of such a strength as will permit it to crystallize, and when water is present, as it must be in all of these methods, after the crystallization of a certain portion of the sugar a large portion is still held in solution in the remaining water, and the crystals part with this sirup with difficulty, a portion remaining on the crystals which have been formed, and a very large portion of the sugar passes out the mold or other purifying-vessel in the form of a viscous sirup, requiring again to be boiled for reconcentration, and producing a sugar of inferior quality. If the sugar could be removed from the vacuum-pan after concentration, it would be desirable to evaporate all the water, so as to get the entire weight of sugar at once in a merchantable form; but this is impracticable, because such a state of fluidity is required as will permit the contents of the pan to run out, and this fluid state is also required to permit the movement of the particles, which necessarily takes place in crystalizing, and hence the necessity of the formation of large amounts of sirup.

The object to be obtained is twofold—viz., to leave the mass as fluid as possible, to give freedom of motion that crystallization may take place without serious restraint, and that the mass may be freely discharged from the vacuum-pan, and also to obtain a high degree of concentration, that the greatest practical proportion of the saccharine matter may be crystallized at the first operation; but these two requirements are in antagonism in all processes heretofore practiced, because by evaporating to obtain a high degree of concentration the sirup is rendered so viscous as to impede the movement of the particles necessary to crystallization, and if carried too far the mass cannot be discharged from the vacuum-pan; and if evaporation is stopped short to retain the required fluidity, then the required cencentration for crystallization is not obtained. In consequence of this the practice has been to make a compromise between the two extremes, which results in waste.

My method of procedure does not call for the presence of any considerable amount of water, and therefore the contents of the pan are not made up in part of a sirup of sugar. Instead of stopping the boiling when the amount crystallized is from forty to sixty per cent., I am enabled to continue the ebullition to a much greater extent, and then while stirring the mass by admitting high-proof commercial alcohol into the vacuum-pan to furnish a fluid capable of holding the crystals in division without dissolving them, and securing the required fluidity for free discharge from the vacuum-pan after having parted with nearly all the water. When the matter is in any purging-vessel the alcohol can be permitted to run off, leaving the crystals in a pure state. The fluid so parted with is alcohol, containing only so much sugar as the accidental presence of water from the impurity of the alcohol or from the incomplete evaporation from the sugar will supply, and thus the yield of sugar as a first return is very much larger than with the aqueous system.

The alcohol, when separated, contains a very small portion of sugar, and this alcohol, by a proper distilling apparatus, may be separated and saved, and the sugar passed back to the vacuum-pan for further evaporation and eventual recovery, as in the manipulation of the original charge.

If desired, a condensing apparatus may intervene between the vacuum-pan and the air-pump, or between the air-pump and the final exit of the vapor, by which all the alcohol may be saved, and thus the vacuum-pan itself take the place of the still before referred to, and the sugar, after leaving the vacuum-pan, may be purged in molds, cisterns, or other apparatus, assisted, if necessary, by vacuum beneath the sugar, so as to avail of the pressure of the atmosphere on its surface for driving down the fluid, or when placed in an inclosed vessel by forcing the atmosphere upon its upper surface, so as to cause the downward flow or travel of the fluid, or if left in a state of rest the alcohol may be parted with from its own gravity, passing down between the crystals and finding its exit at the bottom of the vessel; or if it is desirable to separate the alcoholic portion with greater rapidity it may be received in an ordinary centrifugal machine, such as is commonly used for the separation of fluids from more solid substances, by the operation of which the alcohol will be forced out and separated, leaving the sugar in a merchantable form.

The advantages of my process consist in the use of a fluid to render the contents of the evaporating or vacuum pan mixable without the presence of a considerable amount of water, and thus permit the more close concentration of sugar, so as to give a greater yield than could be obtained by the former practice, at the same time obtaining a condition of the mass as will secure its ready flow from the pan and more perfect or easy separation of the fluid from the crystals or purging from the mold than can be obtained from any known methods.

I do not claim the use of alcohol for the defecation or clarification of sugar or sugar-juices, as that process is known.

I do not claim the use of alcohol for crystalizing or assisting in the crystallization of sugars, because no such crystallization could occur after my high concentration; but What I do claim, and desire to secure by Letters Patent, is—

The process, substantially as specified for the admission and use in the vacuum-pan of alcohol as a divisor of the crystals after the sugar has parted with all, or nearly all, its water of solution, for the purpose of rendering the mass mixable, and thus permit its easy flow or exit from the pan or evaporating-vessel, and also to be capable of netting or arranging its crystals and parting with its fluid portions and coloring-matter, whereby I am able to obtain a larger percentage of crystals than by the methods before known.

H. N. FRYATT.

Witnesses:
ANDREW DE LACY,
WM. H. BISHOP.